United States Patent
Huang

(10) Patent No.: US 8,400,275 B2
(45) Date of Patent: Mar. 19, 2013

(54) METHOD AND SYSTEM OF UTILIZING RFID TAGS FOR JOINTLY PROCESSING TASK

(75) Inventor: Chih-Hua Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 450 days.

(21) Appl. No.: 12/619,818

(22) Filed: Nov. 17, 2009

(65) Prior Publication Data

US 2010/0134258 A1   Jun. 3, 2010

(30) Foreign Application Priority Data

Dec. 1, 2008   (TW) .............................. 97146579 A

(51) Int. Cl.
*H04Q 5/22* (2006.01)
(52) U.S. Cl. .................. 340/10.33; 340/10.1; 340/572.1
(58) Field of Classification Search .............. 340/10.33, 340/1.1, 10.3, 10.1–10.6, 572.1–572.9; 700/4, 700/1, 2
See application file for complete search history.

(56) References Cited

U.S. PATENT DOCUMENTS

| | | | |
|---|---|---|---|
| 5,489,908 A * | 2/1996 | Orthmann et al. | 340/10.32 |
| 5,602,538 A * | 2/1997 | Orthmann et al. | 340/10.2 |
| 6,172,596 B1 * | 1/2001 | Cesar et al. | 340/10.41 |
| 6,538,563 B1 * | 3/2003 | Heng | 340/10.2 |
| 7,616,117 B2 * | 11/2009 | Streeb et al. | 340/572.1 |
| 2003/0036809 A1 * | 2/2003 | Landman et al. | 700/4 |
| 2003/0137403 A1 * | 7/2003 | Carrender et al. | 340/10.4 |
| 2006/0034348 A1 * | 2/2006 | Schaefer et al. | 375/130 |
| 2007/0013484 A1 * | 1/2007 | Carrender et al. | 340/10.4 |
| 2007/0159330 A1 * | 7/2007 | Chakraborty et al. | 340/572.1 |
| 2007/0262851 A1 * | 11/2007 | Stewart et al. | 340/10.41 |
| 2008/0018431 A1 * | 1/2008 | Turner et al. | 340/10.2 |
| 2010/0066510 A1 * | 3/2010 | Huang | 340/10.42 |
| 2010/0207739 A1 * | 8/2010 | Smith et al. | 340/10.4 |

* cited by examiner

*Primary Examiner* — Brian Zimmerman
*Assistant Examiner* — An T Nguyen
(74) *Attorney, Agent, or Firm* — Edell, Shapiro & Finnan, LLC

(57) ABSTRACT

A method of utilizing RFID tags for jointly processing a task and an associated system are provided. The method includes causing a plurality of RFID tags to enter a ready state, causing the RFID tags to enter an accessible state in turn, transmitting the task to the RFID tags, utilizing the RFID tags to jointly process the task, and reading a result from the RFID tags having processed the task.

14 Claims, 6 Drawing Sheets

METHOD AND SYSTEM OF UTILIZING RFID TAGS FOR JOINTLY PROCESSING TASK

CROSS REFERENCE TO RELATED PATENT APPLICATION

This patent application is based on Taiwan, R.O.C. patent application No. 097146579 filed on Dec. 1, 2008.

FIELD OF THE INVENTION

The present invention relates to a method and system of utilizing radio frequency identification (RFID) tags for processing a task, and more particularly, to a method and system of utilizing a plurality of RFID tags for jointly processing a task.

BACKGROUND OF THE INVENTION

An RFID system includes an RFID reader and at least one RFID tag. FIG. 1 shows a structural diagram of a conventional RFID tag 100. The RFID tag 100 comprises an RF receiver 101, an RF transmitter 103, a storage device unit 105 and a control circuit 107. The RF receiver 101 and the RF transmitter 103 receive from or transmit to the RFID reader messages and data. The control circuit, e.g., a processor or a circuit with operational capabilities, responds to requests from the reader, and controls operations of other elements. The storage device unit 105 stores specific data.

FIG. 2 shows a state flow of an RFID tag, which is controlled by an RFID reader to enter different states. As shown, the state flow comprises a ready state, an arbitrate state, a reply state, an acknowledged state, an open state, a secured state and a killed state. In the ready state, supposing the RFID tag is a passive RFID tag, it means that the RFID tag generates power from received signals. The RFID tag then receives a command from the RFID reader and enters the arbitrate state. Only one of the RFID tags is selected to enter the states subsequent to the reply state, while other RFID tags await in the arbitrate state. In the acknowledged state, the RFID reader sends an identification code, such as Handle in this example, for identification when the RFID reader accesses data.

Generally speaking, the foregoing ready, arbitrate, reply, and acknowledged operations are preparatory steps for accessing the RFID tag. After the open state and the secured state, the RFID tag enters an accessible state. In the open state, only a part of the data stored in a first RFID tag is accessible. In the secured state, the RFID tag needs to receive a specific code before more stored data therein can be accessed. Once having been fully accessed, the RFID tag returns to the ready state. Referring to FIG. 2, the RFID tag skips the acknowledged state and directly enters the secured state from the open state. Alternatively, the RFID tag skips the open state and directly enters the secured state from the acknowledged state. Detailed operations of accessing an RFID tag are known to a person having ordinary skill in the art, and thus shall not be unnecessarily further discussed.

An RFID system mainly serves for identification purposes; that is, identification data is stored in the storage device unit 105 of the RFID tag 100, and the identification data is then read by an RFID reader. However, as performance of the control circuit 107 of the RFID tag 100 improves, system resources capable of executing more complex tasks would be wasted if the RFID were to merely serve as an identification device.

SUMMARY OF THE INVENTION

Therefore, it is one object of the invention to provide a method of utilizing RFID tags for jointly processing a task and an associated device, which transmit a task to a plurality of RFID tags and utilize the RFID tags for jointly processing the task to increase processing efficiency.

According to one embodiment of the invention, a method of utilizing RFID tags for jointly processing a task is provided. The method comprises steps of causing a plurality of RFID tags to enter a ready state, causing the RFID tags to enter an accessible state in turn, transmitting the task to the RFID tags, utilizing the RFID tags for jointly processing the task, and reading a result from the RFID tags having processed the task.

According to another embodiment of the invention, a system of utilizing RFID tags for jointly processing a task is provided. The system comprises an RFID reader and a plurality of RFID tags. The RFID reader causes the RFID tags to enter an accessible state, transmits the task to the RFID tags, causes the RFID tags to enter a standby state and processes the task, and reads a result from the RFID tags having processed the task.

According to another embodiment of the invention, a system of utilizing RFID tags for jointly processing a task is provided. The system comprises an RFID reader and a plurality of RFID tags. The RFID tags are for jointly processing the task. The RFID reader causes the RFID tags to enter an accessible state, transmits the task to the RFID tags, and reads a result from the RFID tags having processed the task.

Using the embodiments provided by the present invention, system resources of the RFID tags are fully utilized to optimize processing efficiency.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
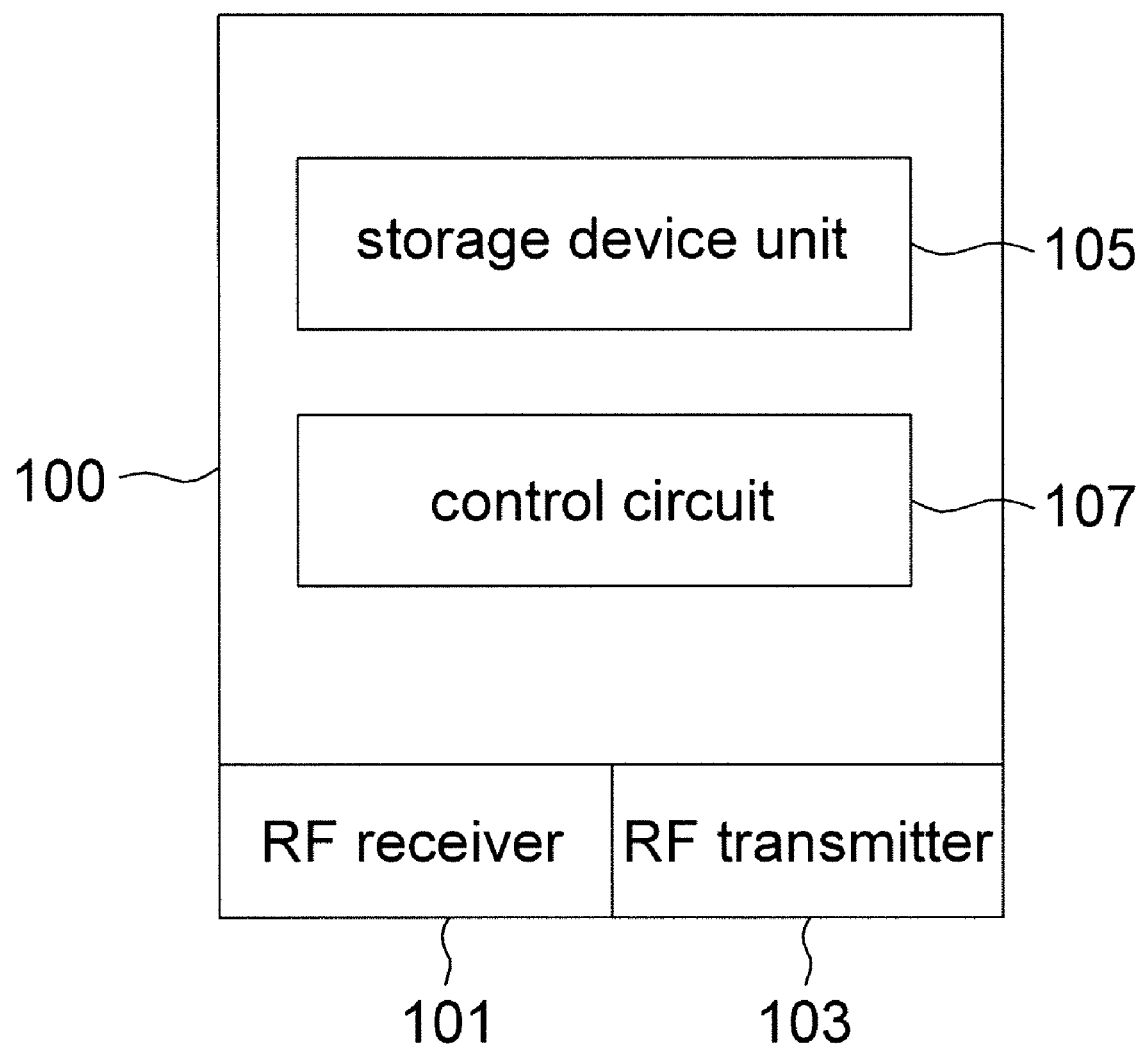
FIG. 1 is a structural diagram of a conventional RFID tag.
Figure 3:
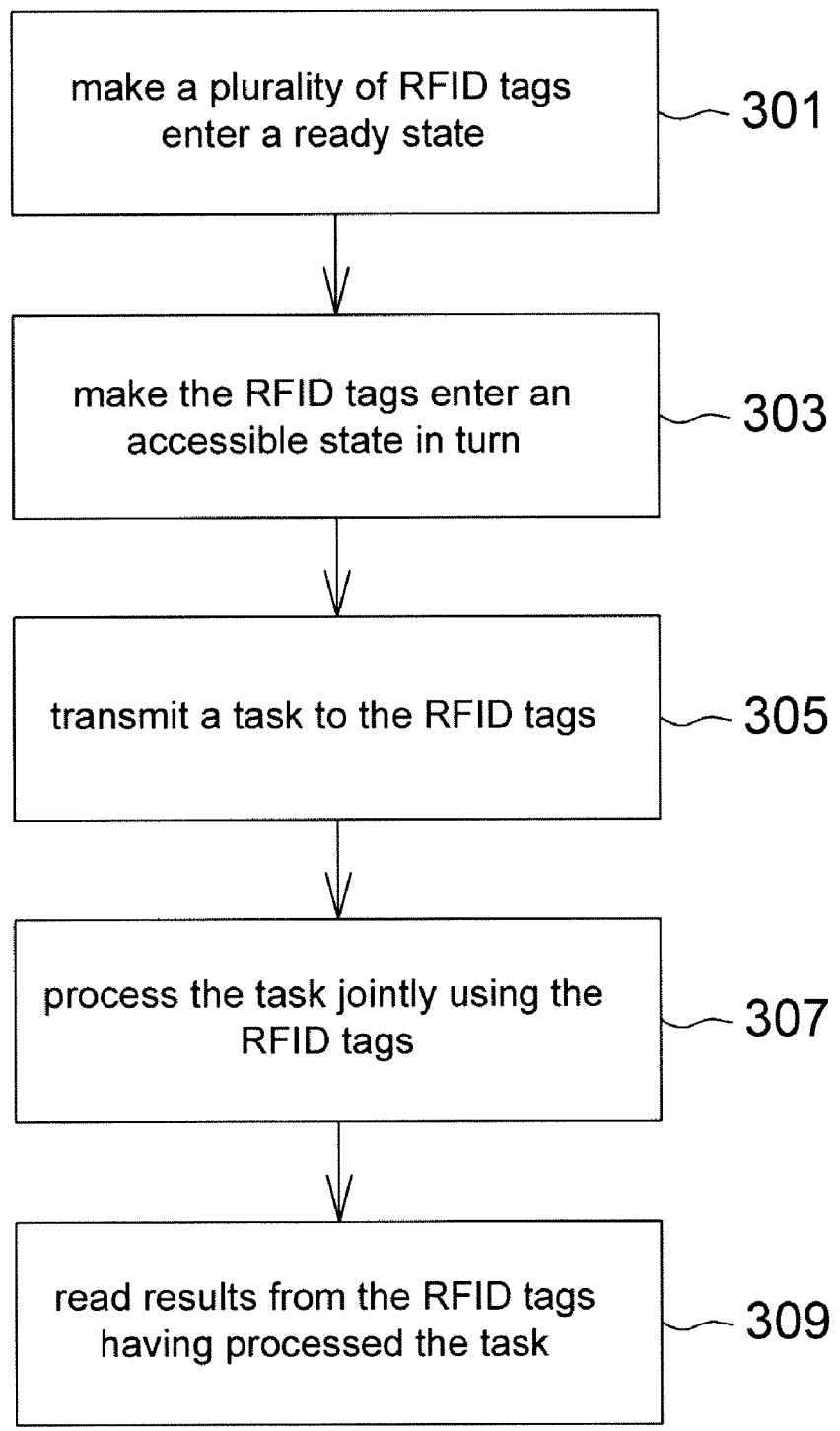
FIG. 3 a flowchart of a method of using RFID tags for jointly processing a task according to one embodiment of the invention.

FIG. 3 shows a flowchart of a method of using RFID tags for jointly processing a task according to one embodiment of the invention. In this embodiment, the RFID tags are controlled via an RFID reader. The method starts with Step 301 of making a plurality of RFID tags enter a ready state, followed by Step 303 of making the RFID tags enter an accessible state in turn. In Step 305, a task is transmitted to the RFID tags. Again referring to FIG. 1, in one embodiment, the RFID reader determines a task suitable for the control circuit 107 of the RFID tag, such as storage device access or data decryption. The RFID reader then assigns the determined task to the RFID tag, and the task is stored into the storage device unit 105. For example, when the RFID reader senses the presence of an RFID tag nearby, the RFID reader transmits a command to the RFID tag to request the RFID tag to report capabilities that the RFID tag possesses, e.g., performance power of the control circuit 107 or capacity of the storage device unit 105, and assigns a task to the RFID tag accordingly. In next Step 307, the task is processed jointly by the RFID tags, and then a result from the RFID tags processing the task is read as in Step 309.

In one embodiment, the RFID reader divides the task into a plurality of sub-tasks according to functions of the RFID tag. Supposing the RFID tag comprises a storage device unit, the sub-tasks are individually stored into the storage device unit. In Step 307, the sub-tasks are processed by the RFID tag; in Step 309, results from the RFID tags respectively processing the sub-tasks are read to obtain a complete task result after integrating the results of the sub-tasks. The task may be a code of an instruction set corresponding to the control circuit 107 of the RFID tag. For example, the task may be an 8051 code when the control circuit 107 comprises an 8051 microprocessor.

Figure 2:
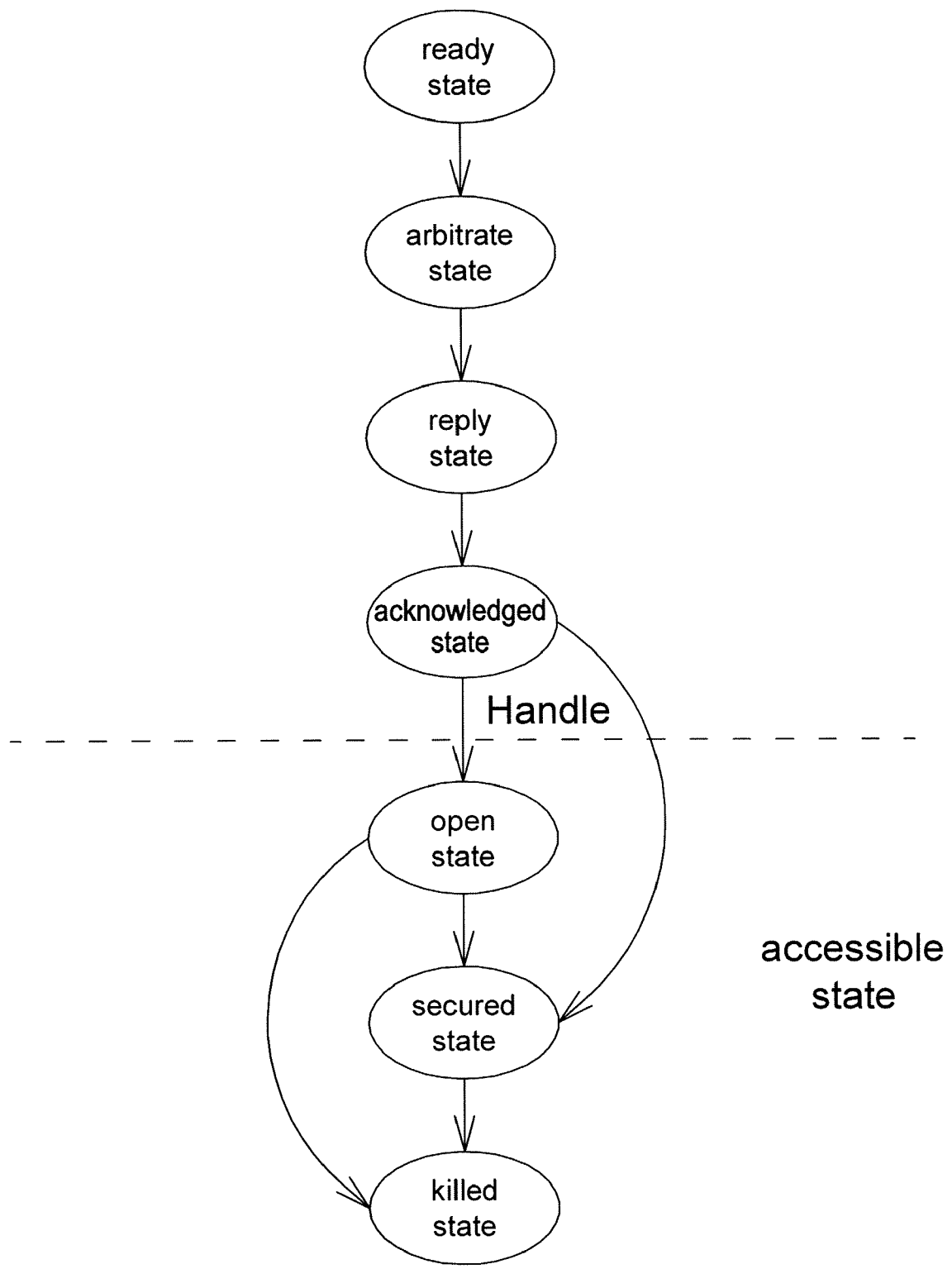
FIG. 2 is a schematic diagram of accessing an RFID tag in the prior art.
Figure 4:
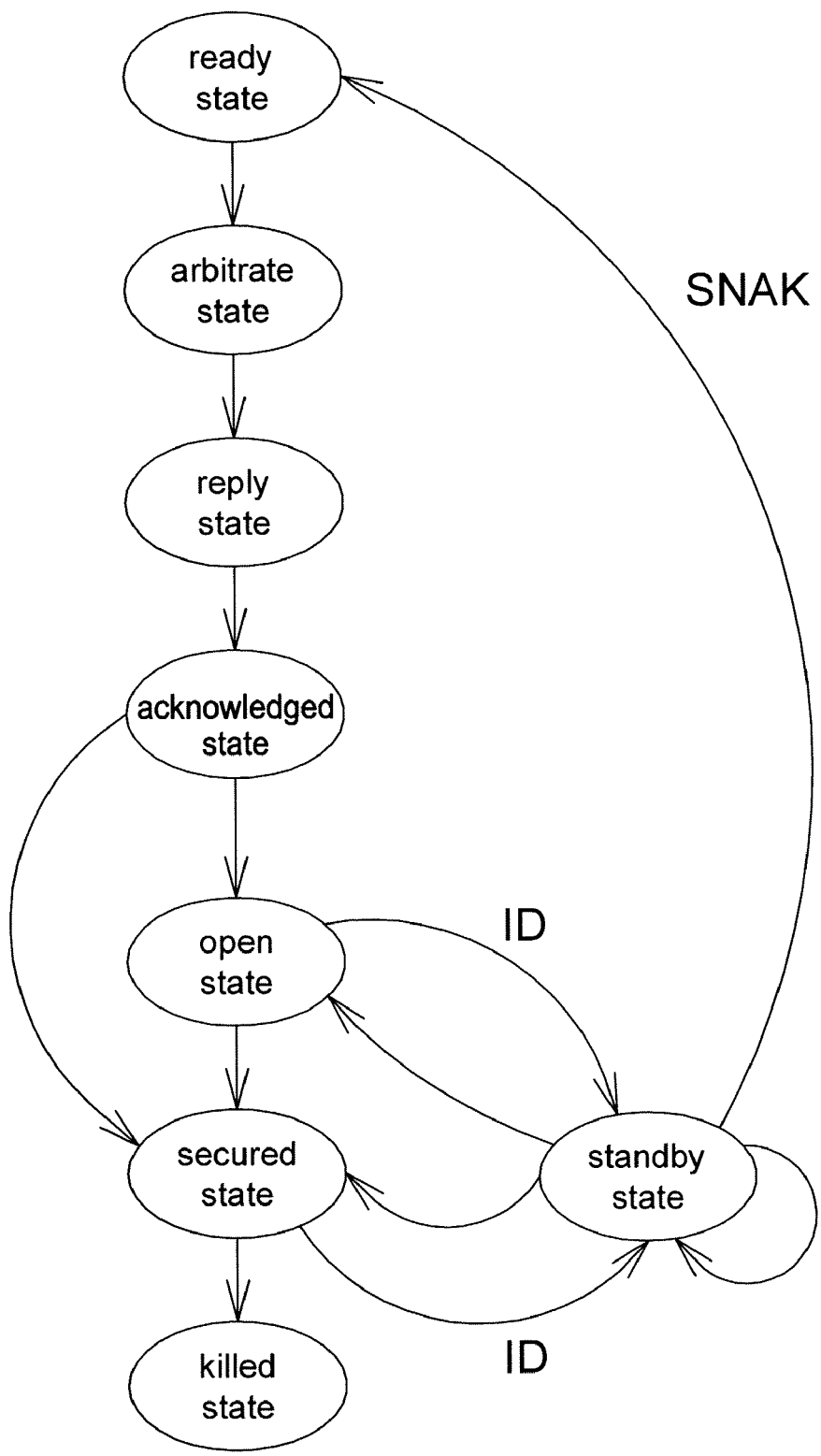
FIG. 4 is a flowchart of an RFID tag entering a standby state according to the invention.

Provided that access flow of the RFID tag adopts steps shown in FIG. 2, the RFID tag may first enter a standby state before performing the foregoing steps. FIG. 4 shows a flowchart of an RFID tag entering a standby state according to the invention.

Only a partial flowchart is depicted for simplification purposes. Reference may also be made to FIG. 2 to better understand the illustrations of FIG. 4. As shown in FIG. 4, after entering an accessible state (i.e., the open or secured state), the RFID tag enters a standby state. Further, more than one RFID tag may simultaneously enter the standby state. Such other RFID tags are preferably given an identification code ID different from the identification code Handle. A distinction between the "identification codes" "Handle" and "ID" is that, the identification code Handle is given in the acknowledged state, and is for identifying an RFID tag to be read among all the RFID tags, whereas the identification code ID is for identifying all RFID tags that are in the standby state. For example, five RFID tags that have entered the standby state are respectively given identification codes ID 1, 2, 3, 4 and 5, such that the RFID tags are clearly identified without any mistake when being awakened from the standby state. Other means for identifying the RFID tags may be implemented apart from giving the RFID tags identification codes ID, as also encompassed within the scope of the invention.

In one embodiment, the RFID tag may be assigned with a task in an accessible state (i.e., the open or secured state), and process the assigned task in the standby state. When the task is completed in the standby state, the RFID tag exits the standby state to return to the open or secured state for subsequent steps.

Figure 5:
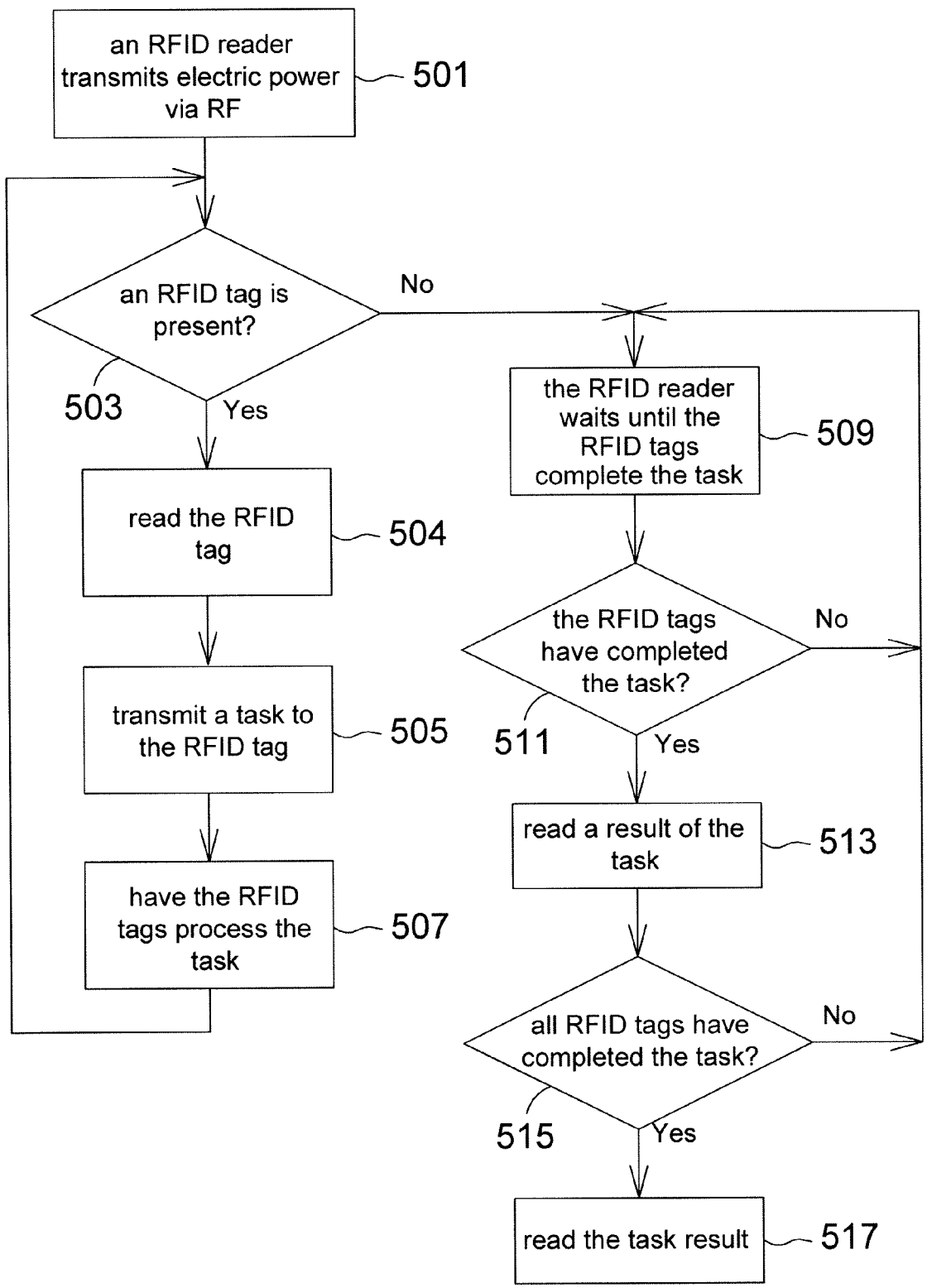
FIG. 5 is a flowchart of an RFID reader implementing the method of utilizing RFID tags for jointly processing a task according to one embodiment of the invention.

FIG. 5 shows a flowchart of an RFID reader implementing the method of utilizing RFID tags for jointly processing a task according to one embodiment of the invention. The flow begins with Step 501, in which the RFID reader transmits electric power via RF. In Step 503, it is determined whether an RFID tag is present. In the event that the RFID reader detects the presence of an RFID tag, it means that there is an RFID tag unassigned with any task. Hence, the flow proceeds to Step 504 where the RFID reader detects an RFID tag. Otherwise, the flow skips to Step 509. In Step 504, the RFID tag is read. Besides reading an Electronic Product Code (EPC) of the RFID tag as in the prior art, capabilities of the RFID tag such as performance power of the control circuit or capacity of the storage device unit are also inquired. In Step 505, a task is transmitted to the RFID tag. At this point, the RFID reader divides the task into a plurality of sub-tasks according to capabilities of each RFID tag, and transmits respective sub-tasks to the RF tags. In Step 507, the RFID tags are requested to process the task. More specifically, the RFID reader transmits a command to the RFID tags to command the RFID tags to start executing respective sub-tasks. When Step 507 is completed, the RFID reader returns to Step 503 to continue in determining whether any other RFID tag is present. If the result is affirmative, the procedure of assigning a task with Steps 504, 505 and 507 are performed. If the result is negative, it means that all the RFID tags have been assigned with the task, and Step 509 is then performed, in which RFID reader waits until the RFID tags complete the task. In Step 511, it is determined whether the RFID tags have completed the task. That is, the RFID reader queries each RFID tag regarding whether it has completed the assigned task. Supposing a particular RFID tag has completed the task, the RFID reader receives a response signal from the particular RFID tag, indicating that the assigned task is completed. If there is not any RFID tag that has not completed the task in this step, the RFID reader returns to Step 509 to wait for the RFID tags to complete the task; if there is an RFID tag that has completed the task, Step 513 is performed next. In Step 513, a result of the task is read. The RFID reader reads the task result processed by the RFID tags and stored in the storage device unit. In Step 515, it is confirmed whether all RFID tags have completed the task. Step 517 is performed if the answer is affirmative, or else the flow returns to Step 509 if the answer is negative. In Step 517, the task result is read. Supposing the task is divided into a plurality of sub-tasks that are then processed by the RFID tags, sub-task results are respectively read in Step 513 and are combined into the task result in Step 517.

Figure 6:
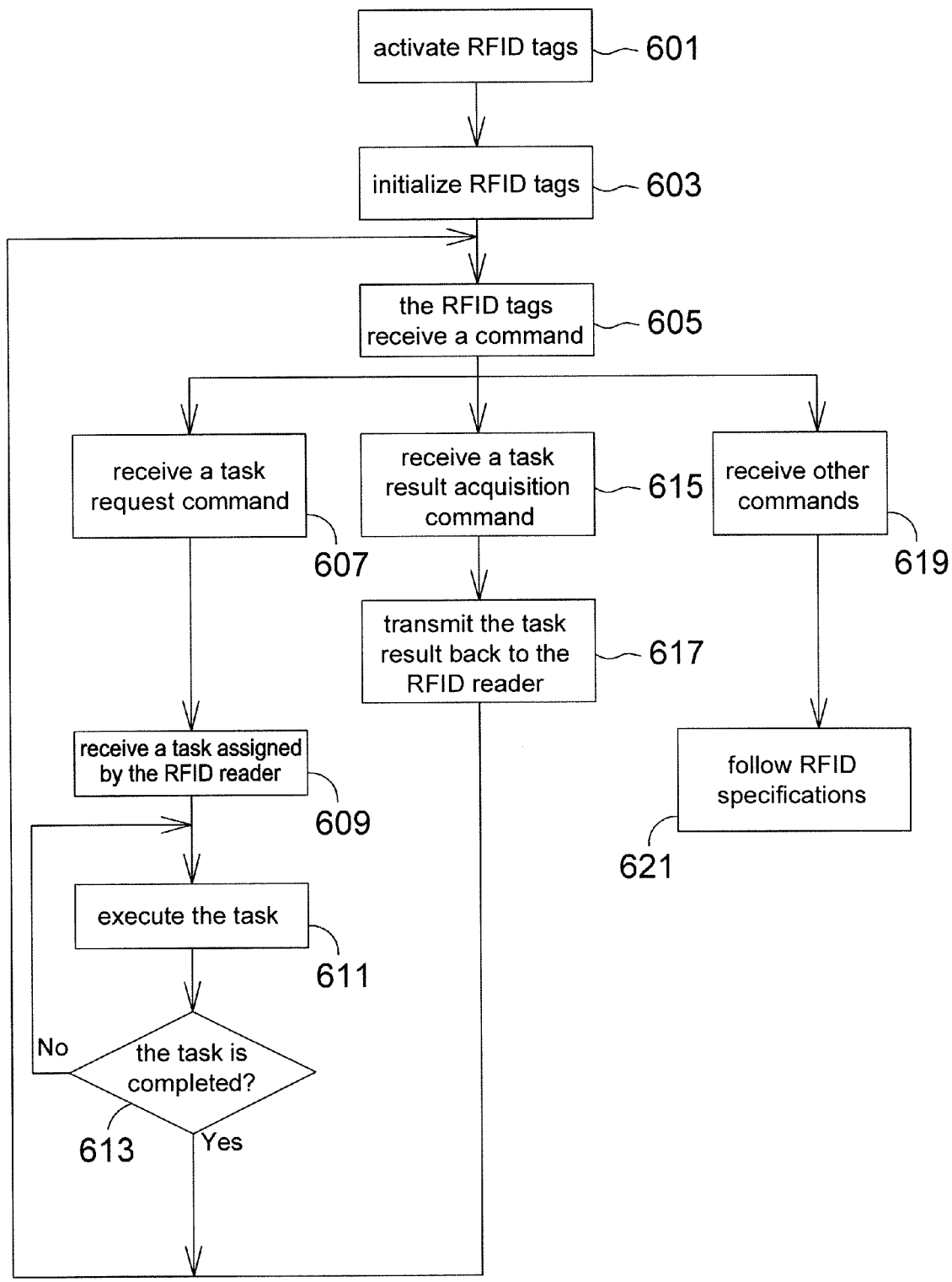
FIG. 6 is a flowchart of an RFID tag implementing the method of utilizing RFID tags for jointly processing a task according to one embodiment of the invention.

FIG. 6 shows a flowchart of an RFID tag implementing the method of utilizing RFID tags for jointly processing a task according to one embodiment of the invention. In Step 601, RFID tags are activated. That is, passive RFID tags receive RF signals transmitted from an RFID reader and convert the RF signals into power to activate, while active RFID tags activate using intrinsic power. In Step 603, the RFID tags are initialized. For example, the RFID tags are reset, or memories and registers in the RFID tags are initialized. In Step 605, the RFID tags receive a command. According to types of commands, Steps 607, 615 and 619 are respectively performed. Step 607 is performed when the command is a task request; Step 615 is performed when the command is a result acquisition command; Step 619 is performed when the command is another type of command. In Step 607, a task request command is received. The task request command may include an RFID tag capability inquiry, to which the RFID tags shall report capabilities thereof to the RFID reader in response, such as performance power or a control circuit or capacity of a storage unit. In Step 609, a task assigned by the RFID reader is received. Storing the assigned task to a storage unit may also be included in this step. In Step 611, the task is executed. In Step 613, it is determined whether the task is completed. If the answer is affirmative, the RFID reader queries for the task result; else, the flow returns to Step 611 to continue executing the task. In Step 615, a task result acquisition command is received. More specifically, the RFID tag receives from the RFID reader a signal asking the RFID tag to transmit a signal reporting the task result. In Step 617, the task result is transmitted back to the RFID reader, and the flow returns to Step 605 to receive a next command. In Step 619, another command is received. In this embodiment, another command is a command other than the task request command and the task result acquisition command. In Step 621, RFID specifications are followed. That is, common RFID specifications are followed when the RFID tag receives another command.

According to the description above, a data processing system comprising an RFID reader and a plurality of RFID tags is obtained, wherein the RFID tags are for jointly processing a task. The RFID reader makes the RFID tags enter an accessible state, transmits the task to the RFID tags and reads a result from the RFID having processed the task. Other details and characteristics are as disclosed in the foregoing embodiments, and shall not be further discussed for brevity.

Therefore, as described in the above embodiments, a task is assigned to RFID tags for processing, whereby resources of an RFID system are fully utilized and tasks are efficiently handled.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of utilizing a plurality of radio frequency identification (RFID) tags for jointly processing a task, comprising steps of:
   a) causing the RFID tags to enter a ready state;
   b) causing the RFID tags to enter an accessible state in turn;
   c) transmitting the task to the RFID tags;
   d) causing the RFID tags to enter a standby state, and jointly processing the task utilizing the RFID tags in the standby state; and
   e) reading a result from the RFID tags having processed the task,
   wherein step (c) further comprises steps of:
   c1) detecting a processing capability of each of the RFID tags, and dividing the task into a plurality of sub-tasks according to the processing capability; and
   c2) assigning the sub-tasks to the RFID tags, respectively.

2. The method as claimed in claim 1, wherein each of the RFID tags comprises a storage device, and the task is stored in the storage devices, respectively.

3. The method as claimed in claim 1, wherein each of the RFID tags comprises a control circuit for processing the task.

4. The method as claimed in claim 1, being performed using an RFID reader.

5. The method as claimed in claim 1, wherein the task is a code or an instruction set.

6. A system of jointly processing a task utilizing RFID tags, comprising:
   the RFID tags; and
   an RFID reader, for causing the RFID tags to enter an accessible state, transmitting the task to the RFID tags, causing the RFID tags to enter a standby state and processing the task while in the standby state, and reading a result from the RFID tags having processed the task,
   wherein the RFID tags have different data processing capabilities, and the RFID reader divides the task into a plurality of sub-tasks according to the data processing capabilities, and assigns the sub-tasks to the RFID tags, respectively.

7. The system as claimed in claim 6, wherein each of the RFID tags comprises a storage device, and the task is stored in the storage devices of the RFID tags, respectively.

8. The system as claimed in claim 6, wherein each of the RFID tags comprises a control circuit for processing the task.

9. The system as claimed in claim 6, wherein the task is a code or an instruction set.

10. A system for jointly processing a task utilizing RFID tags, comprising:
    the RFID tags, for jointly processing the task; and
    an RFID reader, for causing the RFID tags to enter an accessible state, transmitting the task to the RFID tags, and reading a result from the RFID tags having processed the task,
    wherein the RFID reader causes the RFID tags to enter a standby state, in which the RFID tags process the task, the RFID tags have different data processing capabilities, and the RFID reader divides the task into a plurality of sub-tasks according to the data processing capabilities, and assigns the sub-tasks to the RFID tags, respectively.

11. The system as claimed in claim 10, wherein each of the RFID tags comprises a storage device, and the task is respectively stored in the storage devices of the RFID tags.

12. The system as claimed in claim 10, wherein each of the RFID tags comprises a control circuit for processing the task.

13. The method as claimed in claim 1, wherein the sub-tasks are processed by the RFID tags respectively to generate a plurality of sub-task results, and obtaining a complete result by integrating the sub-task results.

14. The method as claimed in claim 1, further comprising: reporting capabilities that the RFID tags possess in response to an RFID tag capability inquiry received by the RFID tags.

* * * * *